United States Patent [19]

Nakamura et al.

[11] Patent Number: 5,932,513

[45] Date of Patent: Aug. 3, 1999

[54] CONTAINER PACKED WITH POWDER OF HYDROGEN ABSORBING ALLOY

[75] Inventors: Hiroshi Nakamura, Neyagawa; Shin Fujitani, Hirakata; Yumiko Nakamura, Daito; Hiroshi Watanabe; Ikuo Yonezu, both of Hirakata; Takahiro Yonesaki, Oura-gun; Kouichi Nishimura, Suita, all of Japan

[73] Assignee: Sanyo Electric Co., Ltd., Moriguchi, Japan

[21] Appl. No.: 09/166,140

[22] Filed: Oct. 2, 1998

Related U.S. Application Data

[62] Division of application No. 08/901,193, Jul. 28, 1997, which is a continuation of application No. 08/336,206, Nov. 4, 1994, abandoned.

[30] Foreign Application Priority Data

May 11, 1993 [JP] Japan ................................. 5-276597
Apr. 10, 1994 [JP] Japan ................................. 6-239939

[51] Int. Cl.$^6$ .............................. B01J 20/02; B01J 20/28; B22F 1/00; B22F 3/02

[52] U.S. Cl. ..................... 502/400; 502/406; 502/439; 502/527.24; 75/228; 75/255; 428/34.1; 420/83; 420/416; 420/441; 420/455; 204/193

[58] Field of Search ..................................... 502/400, 406, 502/527.24, 439; 75/228, 255; 428/34.1; 420/83, 416, 441, 455; 204/193

[56] References Cited

U.S. PATENT DOCUMENTS

| | | |
|---|---|---|
| 4,310,601 | 1/1982 | Bernauer et al. . |
| 4,360,569 | 11/1982 | Steyert et al. . |
| 4,607,826 | 8/1986 | Ron . |
| 4,737,249 | 4/1988 | Shepard, Jr. et al. . |
| 5,443,616 | 8/1995 | Congdon . |

FOREIGN PATENT DOCUMENTS

| | | |
|---|---|---|
| 59-46881 | 11/1984 | Japan . |
| 61-40021 | 9/1986 | Japan . |

*Primary Examiner*—Elizabeth Wood
*Attorney, Agent, or Firm*—Armstrong, Westerman, Hattori, McLeland & Naughton

[57] ABSTRACT

A container packed with a mixture of powders classified respectively into two or at least three particle-size distribution groups which are different in average particle size, the powders comprising a hydrogen absorbing alloy singly or the combination of such an alloy and a substance not absorbing hydrogen. The mixture is at least 0.03 to not greater than 0.50 in the ratio $d_2/d_1$ wherein $d_1$ is the average particle size of the powder having the particle-size distribution of the largest average particle size, and $d_2$ is the average particle size of the powder having the particle-size distribution of the second largest average particle size. The weight ratio of the powder to the total weight of the powders is greater when that powder has a particle-size distribution of larger average particle size. The weight ratio of the powder having the particle-size distribution of the second largest average particle size to the powder having the particle-size distribution of the largest average particle size is at least 0.2 to not greater than 0.8.

4 Claims, 5 Drawing Sheets

CONTAINER PACKED WITH POWDER OF HYDROGEN ABSORBING ALLOY

This application is a division of prior application Ser. No. 08/901,193 filed Jul. 28, 1997, which is a continuation of Ser. No. 08/336,206 filed Nov. 4, 1994, abandoned.

FIELD OF THE INVENTION

The present invention relates to containers packed with a powder of hydrogen absorbing alloy which is adapted to reversibly absorbing and desorbing hydrogen.

BACKGROUND ART

Conventionally, it is practice to pulverize an ingot of hydrogen absorbing alloy obtained by melting and filling the resulting powder into a container of specified capacity, for example, for use in batteries wherein the electrode is made of hydrogen absorbing alloy and in heat pumps wherein such alloy is utilized. Hydrogen absorbing alloys need to be treated for activation so as to exhibit their hydrogen absorbing and desorbing ability to the greatest possible extent. The alloy is pulverized, thereby given an increased surface area and rendered easy to activate.

In order to realize desired features of hydrogen equilibrium pressure conforming to the purpose of use of heat pumps or the like and further obtain a hydrogen absorbing agent having a capability of storing a large amount of hydrogen and an increased speed of reaction, it has been proposed to admix (A) 20 to 80 wt. % of Mg—Ni alloy with (B) 20 to 80 wt. % of an alloy selected from the group consisting of Ca—Ni alloys, Mm(misch metal)—Ni alloys and Mm—Co alloys (Examined Japanese Patent Publication 59-46881).

It has also been proposed to admix a small amount of a hydrogen absorbing alloy of the titanium-zirconium-manganese type having the drawback of marked hystresis and small heat of reaction with a misch metal-nickel-aluminum alloy having the drawback of being relatively small in the amount of hydrogen to be absorbed per unit weight and low in reaction velocity (Examined Japanese Patent Publication SHO 61-40021).

When a powder of hydrogen absorbing alloy is to be filled into a container of definite capacity, it is desired to fill a large amount of the alloy with voids diminished to the greatest possible extent. However, the particles of hydrogen absorbing alloy obtained by pulverizing an ingot differ variously in size and shape and are difficult to fill to a high density with voids inevitably formed among the particles.

In the case where the container of definite capacity is to be packed with particles of approximately the same size, it is difficult to make the void fraction less than 0.5 which is the limit value for the void fraction to be involved when the particles are assumed to be spherical, because the particles are actually not spherical. The term "void fraction" as used herein means the ratio of the voids (spaces) to the bulk volume of a material.

On the other hand, if powders which are different in average particle size are mixed together and filled, small particles will enter interstices between large particles to result in a decreased void fraction.

Accordingly, in packing a container with powders of hydrogen absorbing alloy which are different in particle size, shape, etc., an object of the present invention is to provide an increased hydrogen absorbing capacity per unit internal volume of the container by filling the powers into the container to a high density so that the resulting void fraction is smaller than 0.5.

The present invention gives an increased hydrogen absorbing capacity to the energy storage container of fuel cells and a higher capacity to cells wherein the electrode is made of hydrogen absorbing alloy and provides compacted heat pumps wherein hydrogen absorbing alloy is utilized.

SUMMARY OF THE INVENTION

The present invention relates to a container packed with a mixture of powders classified respectively into two or at least three particle-size distribution groups different in average particle size, the powders comprising a hydrogen absorbing alloy singly or the combination of a hydrogen absorbing alloy and a substance not absorbing hydrogen, the mixture being at least 0.03 to not greater than 0.50 in the ratio $d_2/d$ wherein $d_1$ is the average particle size of the powder having the particle-size distribution of the first largest average particle size, and $d_2$ is the average particle size of the powder having the particle-size distribution of the second largest average particle size.

The present invention relates to a container packed with a mixture of powders classified respectively into at least three particle-size distribution groups different in average particle size, the powders comprising a hydrogen absorbing alloy singly or the combination of a hydrogen absorbing alloy and a substance not absorbing hydrogen, the mixture being at least 0.03 to not greater than 0.50 in the ratio $d_{N+1}/d_N$ wherein $d_N$ is the average particle size of the powder having the particle-size distribution of the Nth largest average particle size, and $d_{N+1}$ is the average particle size of the powder having the particle-size distribution of the (N+1)th largest average particle size.

The present invention relates to a molded body prepared by applying pressure to a mixture of powders and a binder, the powders being classified respectively into two or at least three particle-size distribution groups which are different in average particle size, the powders comprising a hydrogen absorbing alloy singly or the combination of a hydrogen absorbing alloy and a substance not absorbing hydrogen, the mixture being greater than 0 to not greater than 0.50 in the ratio $d_2/d_1$ wherein d is the average particle size of the powder having the particle-size distribution of the first largest average particle size, and $d_2$ is the average particle size of the powder having the particle-size distribution of the second largest average particle size.

DETAILED DESCRIPTION OF THE INVENTION

The powder obtained by pulverizing a hydrogen absorbing alloy is usually classified with JIS (Japanese Industrial Standard) standard sieves. When classified with sieves, the powder, which has varying particle sizes, exhibits a particle-size distribution of the normal distribution type which is dependent on the average and dispersion. Accordingly, the term the "average particle size" of a powder as used herein means the average size of a group of particles having a certain particle-size distribution.

Figure 1A:
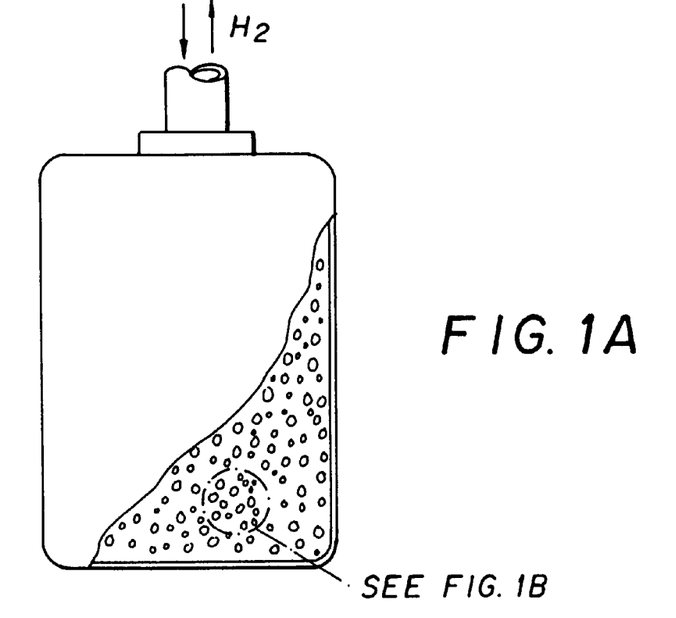
FIG. 1 is a front view showing a container packed with a powder of hydrogen absorbing alloy according to the invention, the container being partly broken away to show the powder on an enlarged scale.
Figure 1B:
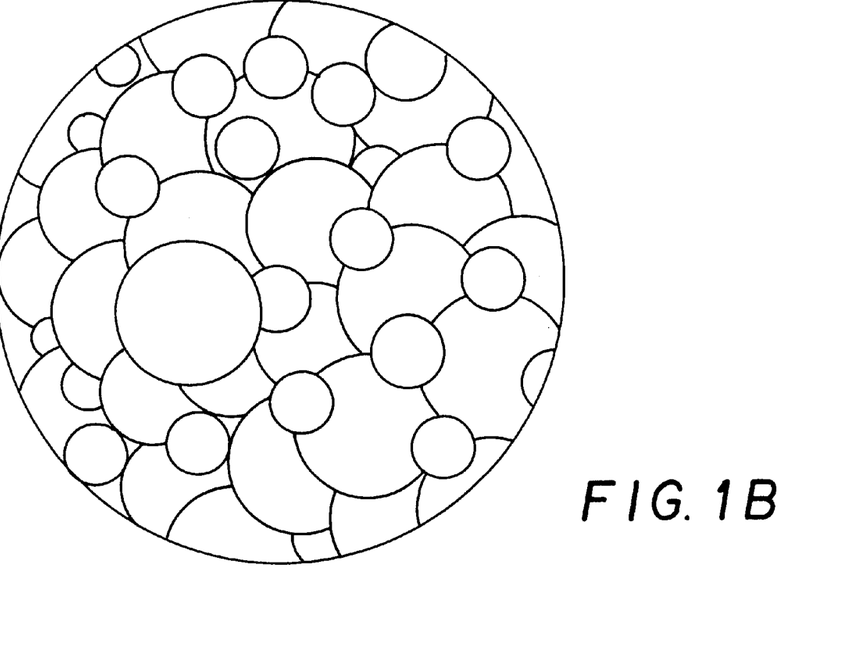

FIG. 1 shows a container packed with a mixture of powders as classified respectively into two particle-size distribution groups which are different in average particle size. Although FIG. 1 shows spherical particles for the sake of convenience, the particles obtained by pulverizing an ingot of hydrogen absorbing alloy with a pulverizing jig and pulverizer mill actually have a three-dimensional shape with an irregular surface.

EXAMPLE 1

First in Example 1, two kinds of powders, different in average particle size, were checked for the relationship between the average particle size ratio and the void fraction.

An ingot of $LaNi_5$ alloy prepared by high-frequency induction melting was ground by a pulverizing jig and pulverizer mill, and the resulting powder was classified with twenty different JIS standard sieves ranging from 26 mesh to 440 mesh to obtain nineteen kinds of powders different in particle size and ranging from about 35 $\mu$m to about 550 $\mu$m in average particle size. (Although the twenty different sieves used gave 21 kinds of classified powders, the powder passing through the sieve of the smallest mesh size and the powder remaining on the sieve of the largest mesh size were excluded from the present example because of inaccurate particle sizes.) A powder of about 550 $\mu$m in average particle size was used as the powder of large average particle size (powder 1). Each of the 19 kinds of powders ranging from about 35 $\mu$m to about 550 $\mu$m in average particle size was used as the powder of small average particle size (powder 2). The powder 1 and the powder 2 were mixed together in the latter to the former weight ratio of 0.5 to obtain a mixture, which was checked for void fraction.

The void fraction of the mixture having a particular particle size ratio was calculated from the following equation using the bulk density of the mixture measured by the method of JIS Z2504 and the true density of the mixture determined by X-ray diffractometry.

$$\text{Void fraction} = \frac{V - V_p}{V} = \frac{V/W - V_p/W}{V/W} = \frac{1/\rho - 1/\rho_p}{1/\rho}$$

$$= \frac{\rho_p - \rho}{\rho_p}$$

wherein

V: bulk volume; V substantial volume;

W: weight of mixture; $\sigma$: bulk density;

$\sigma_p$: true density

Figure 2:
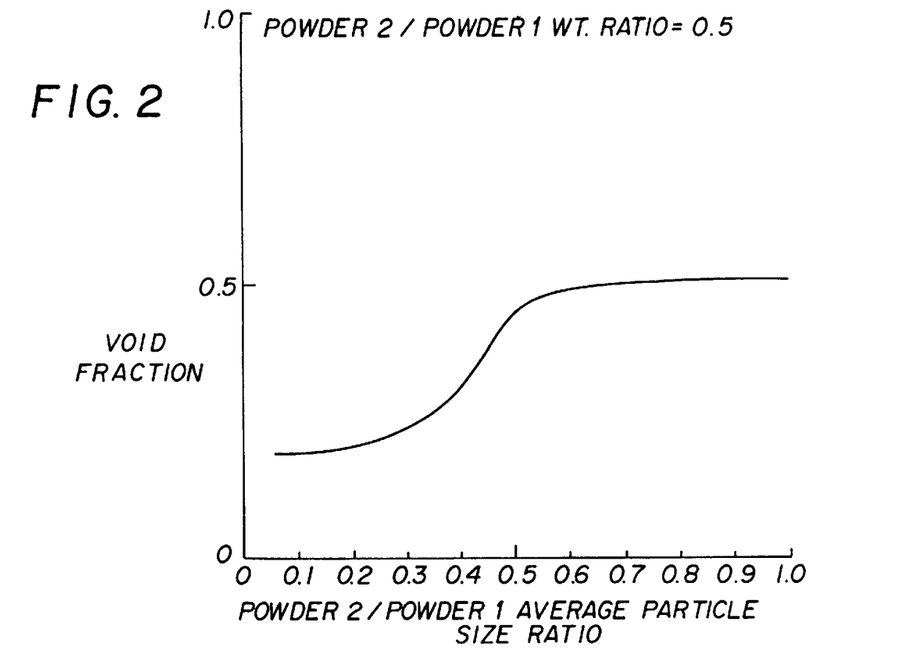
FIG. 2 is a graph showing the relationship between the void fraction and the ratio of the average particle size of a powder 2 to that of a powder 1.

FIG. 2 shows the void fractions determined. In FIG. 2, plotted as abscissa is the ratio of the average particle size $d_2$ of the powder 2 to the average particle size $d_1$ of the powder 1, i.e., $d_2/d_1$.

FIG. 2 reveals that in the case where two kinds of powders which are different in average particle size are mixed together, the void fraction does not reduce when the average particle size ratio ($d_2/d_1$) of the powder 2 to the powder 1 of greater average particle size is at least about 0.6, but reduces as the ratio decreases from about 0.6. With the present invention, therefore, the average particle size ratio should be up to 0.5, preferably up to 0.4, more preferably up to 0.3.

On the other hand, if the average particle size ratio is too small, the spaces between the large particles will be fully packed with small particles, eliminating the voids almost completely. When absorbing hydrogen, hydrogen absorbing alloys expand, so that greatly diminished voids are not desirable since pressure is then likely act on the inner wall of the container. For this reason, the ratio $d_2/d_1$ should be at least 0.03.

EXAMPLE 2

When a powder of varying particle sizes is classified with sieves, it is thought that the particle sizes are in a normal distribution as previously mentioned. Now, as to two kinds of powders which are different in average particle size, suppose $\sigma_1$ is the standard deviation of normal distribution function of particle sizes of the powder 1 having the larger average particle size, and $\sigma_2$ is the standard deviation of normal distribution function of particle sizes of the powder 2 of smaller average size. A case wherein the difference between the powders in particle size is smallest is then assumed, and is represented in terms of the ratio $(d_2+2\sigma_2)/(d_1-2\sigma_1)$. If this value is in the range of 0.03 to 0.50, 98% of all the particles will be within the range of 0.03 to 0.50 in particle size ratio. The influence of the remaining 2% of particles is almost negligible in this case, so that the container can be accurately packed with the powders to a high density.

In Example 2, two kinds of powders, different in average particle size, were used to determine the relation between the ratio $(d_2+2\sigma_2)/(d_1-2\sigma_1)$ and the void fraction.

Through the same procedure as in Example 1, a powder was prepared and then classified to obtain a powder (powder 1) having an average particle size of about 550 $\mu$m with a standard deviation of 16.7 $\mu$m, and 19 kinds of powders (powders 2) ranging from about 35 $\mu$m to about 550 $\mu$m in average particle size. The powder 1 and the powder 2 were mixed together in the latter to former weight ratio of 0.5.

Figure 3:
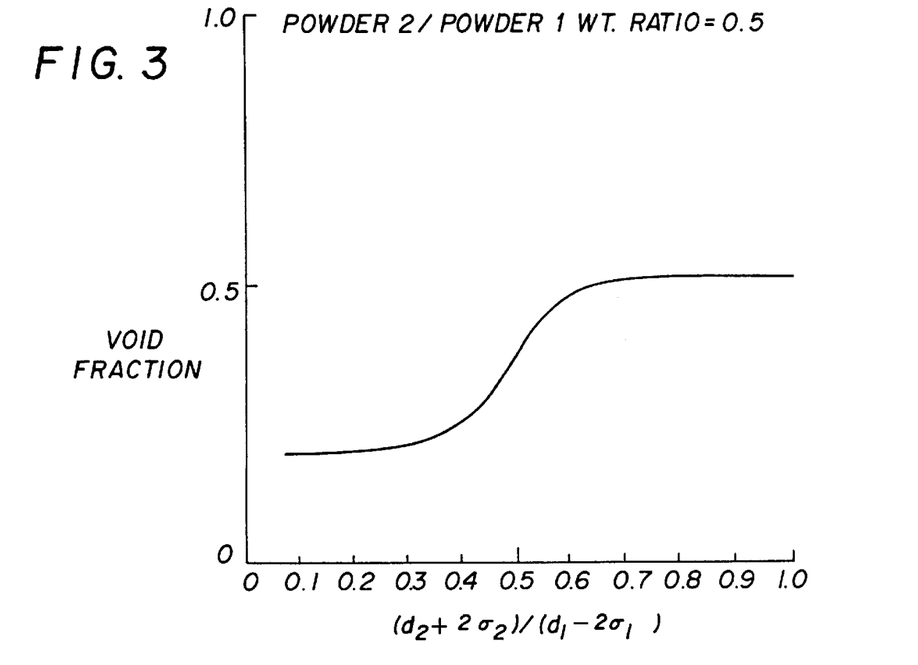
FIG. 3 is a graph showing the relationship between the ratio $(d_2+2\sigma_2)/(d_1-2\sigma_1)$ and the void fraction.

With the standard deviations of the normal distribution functions taken into consideration, the relationship between the ratio of the powder 2 to the powder 1 in particle size $(d_2+2\sigma_2)/(d_1-2\sigma_1)$ and the void fraction of the mixture was determined in the same manner as in Example 1. FIG. 3 shows the result.

FIG. 3 reveals that in the case where two kinds of powders which are different in particle-size distribution are mixed together, the void fraction diminishes as the ratio $(d_2+2\sigma_2)/(d_1-2\sigma_1)$ decreases from about 0.65. A desired void fraction can be obtained by making the average particle size ratio not greater than 0.5, preferably not greater than 0.4, more preferably not greater than 0.3.

EXAMPLE 3

Next in Example 3, two kinds of powders, different in average particle size, were used to establish the relationship between the weight ratio and the void fraction.

Figure 4:
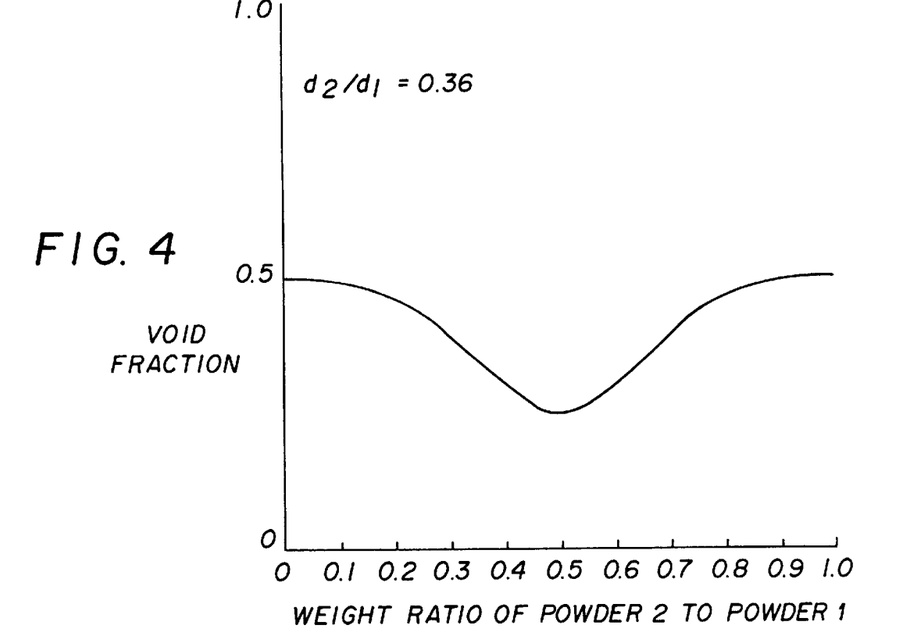
FIG. 4 is a graph showing the relationship between the weight ratio of a powder 2 to a powder 1 and the void fraction.

In the same manner as in Example 1, a powder was prepared and then classified to obtain a powder 1 having an average particle size of 550 μm and a powder 2 having an average particle size of 196 μm. These powders were 0.36 in average particle size ratio $d_2/d_1$. Next, the powder 1 and the powder 2 were mixed together with the weight ratio of the latter to the former altered from 0 to 1, and the mixtures were checked for void fraction. The void fraction was determined by the same method as in Example 1. FIG. 4 shows the result.

FIG. 4 indicates that the void fraction reduces as the weight ratio of the powder 2 of small average particle size to the powder 1 of large average particle size increases from 0.1 or decreases from 0.9. Accordingly, the weight ratio of powder 2 to powder 1 is preferably in the range of 0.2 to 0.8, more preferably 0.3 to 0.7, most preferably 0.4 to 0.6.

EXAMPLE 4

Next, two kinds of powders, different in average particle size, were mixed together in different average particle size ratios and different weight ratios, and the mixtures were checked for void fraction. Table 1 shows the result. The powders were prepared in the same manner as in the foregoing examples by grinding an ingot of LaNi$_5$ alloy with a pulverizing jig and pulverizer mill and classifying the resulting powder with JIS standard sieves.

TABLE 1

| Sample No. | Average particle size ratio | Weight ratio | Void fraction |
|---|---|---|---|
| 1 | 0.35 | 0.11 | 0.49 |
| 2 | 0.35 | 0.40 | 0.30 |
| 3 | 0.18 | 0.22 | 0.32 |

Although samples No. 1 and No. 2 are identical in average particle size ratio, sample No. 2 is 0.4 in weight ratio and is therefore smaller than sample No. 1 in fraction ratio. FIG. 2 of Example 1 shows that when the average particle size ratio is 0.35, the void fraction is about 0.27. This value is still smaller than the void fraction of sample No. 2 because FIG. 2 shows data for a weight ratio of 0.5.

Sample No. 3 is approximately the same as sample 2 in void fraction. Sample No. 3 is smaller than sample No. 2 in average particle size ratio and also in weight ratio, and is consequently comparable thereto in void fraction.

These results indicate that the definition of the weight ratio, as well as of the average particle size ratio, is important in packing the container to a high density.

EXAMPLE 5

A powder of LaNi$_5$ alloy obtained by atomization was classified with JIS standard sieves in the same manner as in the foregoing examples to prepare mixtures of two kinds of powders which were different in average particle size, and containers were packed with the respective mixtures. The samples prepared were the same as those of Example 4 with respect to the average particle size and weight ratio. Table 2 shows the void fractions obtained.

TABLE 2

| Sample No. | Average particle size ratio | Weight ratio | Void fraction |
|---|---|---|---|
| 4 | 0.35 | 0.11 | 0.35 |
| 5 | 0.35 | 0.40 | 0.25 |
| 6 | 0.18 | 0.22 | 0.21 |

When samples Nos. 4 to 6 of Table 2 are compared with samples Nos. 1 to 3 of Table 1, it is seen that samples Nos. 4 to 6 are still smaller in void fraction.

In the case of the atomization process, the molten alloy prepared in a crucible is forced out through a nozzle provided at a lower portion of the crucible into an inert gas flowing at a high speed below the nozzle, and is thereby solidified rapidly, so that the resulting particles are shaped more neatly in relatively rounded form than those prepared by mechanical pulverization. The smaller void fractions are attributable to this feature.

Atomized powders are therefore more desirable for use in filling up containers with a high density.

EXAMPLE 6

Three kinds of powders which were different in average particle size were mixed together, then filled into a container and checked for void fraction.

To prepare the powders, an ingot of LaNi$_5$ alloy was ground by a pulverizing jig and pulverizer mill, and the resulting powder was classified with JIS standard sieves into four fractions which were 550 μm, 155 μm, 95 μm and 35 μm, respectively, in average particle size. Three of the four kinds of powders were selected and mixed together in such amounts that the weight ratio of the powder of the second largest particle size to the powder of the first largest particle size, and the weight ratio of the powder of the third largest particle size to the powder of the second largest particle size were 0.5. Table 3 shows the void fractions obtained.

TABLE 3

| Sample No. | Average particle size (pm) | | | Particle size ratio | | Void fraction |
|---|---|---|---|---|---|---|
| | A | B | C | B/A | C/B | |
| 7 | 550 | 155 | 35 | 0.28 | 0.23 | 0.23 |
| 8 | 550 | 155 | 95 | 0.28 | 0.61 | 0.27 |

It is seen that samples No. 7 and No. 8 are both small in void fraction.

Sample No. 8 is over 0.5 in the particle size ratio of the powder C (of the third largest particle size) to the powder B (of the second largest particle size), and is therefore slightly greater than sample No. 7 in void ratio.

The present example reveals that in the case where a container is to be packed with a mixture of powders classified respectively into at least three particle-size distribution groups which are different in average particle size, a satisfactory void fraction is available if the particle size ratio of the powder of the second largest average particle size to the powder of the first largest size is defined, namely, when the mixture is at least 0.03 to not greater than 0.50 in the ratio $d_2/d_1$ wherein $d_1$ is the average particle size of the powder having the first largest average particle size, and $d_2$ is the average particle size of the powder having the second largest average particle size.

A comparison between sample No. 7 and sample No. 8 indicates that when the average particle size of the powder having the third largest average particle size is $d_3$, the ratio $d_3/d_2$ is more preferably within the range of 0.03 to 0.50.

Accordingly, in the case where a container is to be packed with a mixture of powders classified respectively into at least three particle-size distribution groups which are different in average particle size, it is desired that the mixture be at least 0.03 to not greater than 0.50 in the ratio $d_{N+1}/d_N$ wherein $d_N$ is the average particle size of the powder having the particle-size distribution of the Nth largest average particle size, and $d_{N+1}$ is the average particle size of the powder having the particle-size distribution of the (N+1)th largest average particle size.

EXAMPLE 7

The hydrogen absorbing alloy filling a container repeatedly expands and contracts with the absorption and release of hydrogen, with the result that a great internal stress occurs in the particles, which are in turn broken to undergo size reduction.

Figure 5:
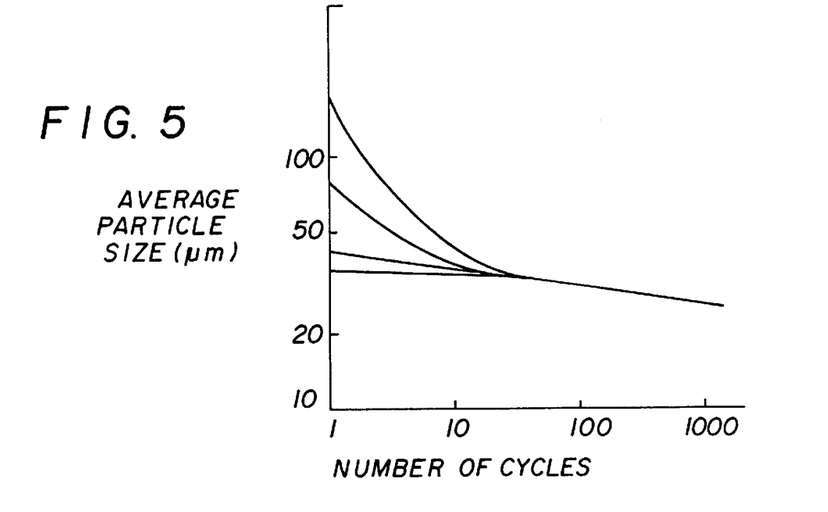
FIG. 5 is a graph showing the relationship between the number of hydrogen absorbing-desorbing cycles to which powders were subjected and the average particle sizes of the respective powders.

Four kinds of LaNi$_5$ alloy powders, about 260 μm, 80 μm, 42 μm and 36 μm in average particle size, were repeatedly subjected to a cycle of absorbing hydrogen under hydrogen pressure of 15 atm. and subsequent desorption of hydrogen. FIG. 5 shows the resulting variations in the average particle sizes of the respective powders. As will be apparent from FIG. 5, the larger the particle size, the more rapid is the progress of size reduction, and about 30 cycles reduce the particle sizes almost uniformly to about 32 μm.

When the hydrogen absorbing alloy is filled into the container, a high packing density can be achieved due to the particle size difference, whereas the repetition of hydrogen absorbing and desorbing cycle renders the powders uniform in particle size to result in the likelihood that the alloy will be unable to retain the initial average particle size ratio because the alloy has the above-mentioned characteristics. In this case, the container becomes no longer packed with a high density, is subjected to an expansion stress of the alloy due to hydrogenation.

It is therefore desired that the powder of smaller average particle size to be used be an alloy which is higher than the powder of large average size in the rate of progress of side reduction due to the absorption and desorption of hydrogen.

However, when powders of different alloys are to be used in mixture, it is desirable to use alloys which are substantially identical in hydrogennation equilibrium characteristics such as plateau pressure and plateau temperature because two kinds of hydrogen absorbing alloys which are different in hydrogenation equilibrium characteristics, if present in the container, are less efficient in absorbing and desorbing hydrogen.

EXAMPLE 8

In Example 8, a molded body was prepared by applying pressure to a mixture of binder and powders of two kinds of hydrogen absorbing alloys which were different in average particle size.

LaNi$_5$ was used as powder 1 of large average particle size, MmNi$_{4.6}$Al$_{0.4}$ (Mm is misch metal) as powder 2 of small average particle size and a polytetrafluoroethylene (PTFE) powder as the binder. The alloy of the powder 2 corresponds to the alloy of powder 1 wherein La is replaced by Mm and 0.4 atomic % of Ni by Al, expands and contracts greatly with the absorption and desorption of hydrogen and is more amenable to size reduction than the powder 1.

The powders 1 and 2 were each prepared in the same manner as in the foregoing examples by preparing an ingot of the corresponding alloy by high-frequency induction melting, grinding the ingot with use of a pulverizing jig and pulverizer mill and classifying the resulting powder with JIS standard sieves. The powder 1 was about 40 μm in average-particle size $d_1$, and the powder 2 had an average particle size $d_2$ of about 12 μm. The average particle size ratio $d_2/d_1$ was 0.30.

Figure 6:
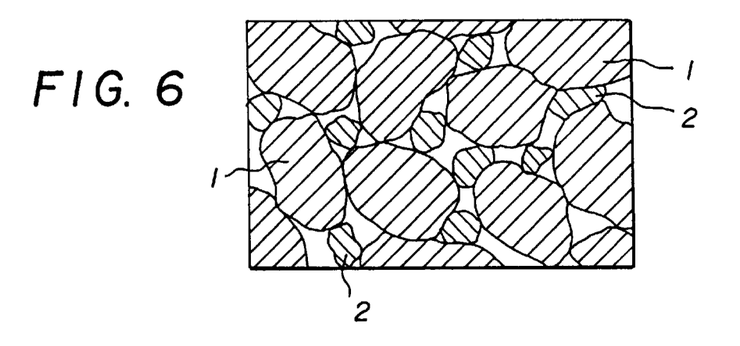
FIG. 6 is an enlarged sectional view schematically showing a powder 1 and a powder 2 as mixed together.

The powder 1 and the powder 2 were mixed together in the latter to the former weight ratio of 0.5 to obtain a mixture. FIG. 6 schematically shows the state of the mixture. Small particles 2 are present in the spaces between large particles 1 to result in a higher packing density.

Subsequently, a powder of binder, about 80 to about 100 μm in particle size, was added in an amount of 12 wt. % based on the powder mixture to the mixture, and the resulting mixture was thoroughly stirred and pressed in a die under a pressure of 100 kg/cm$^2$ to obtain a disklike molded body measuring 15 mm in diameter and 11 mm in thickness.

Figure 7:
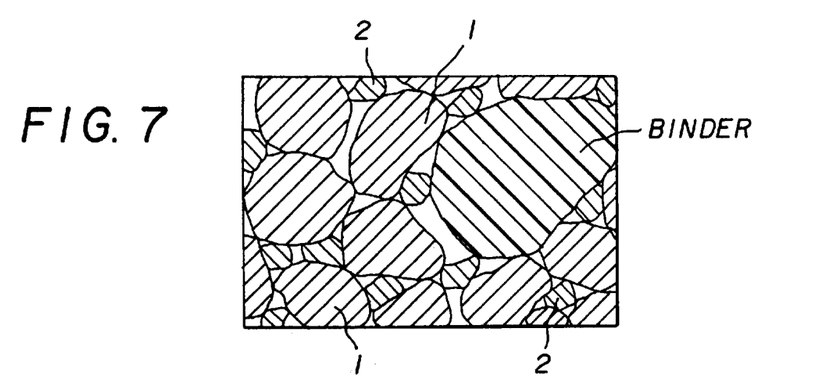
FIG. 7 is an enlarged sectional view schematically showing the powder 1, the powder 2 and a binder as mixed together.
Figure 8:
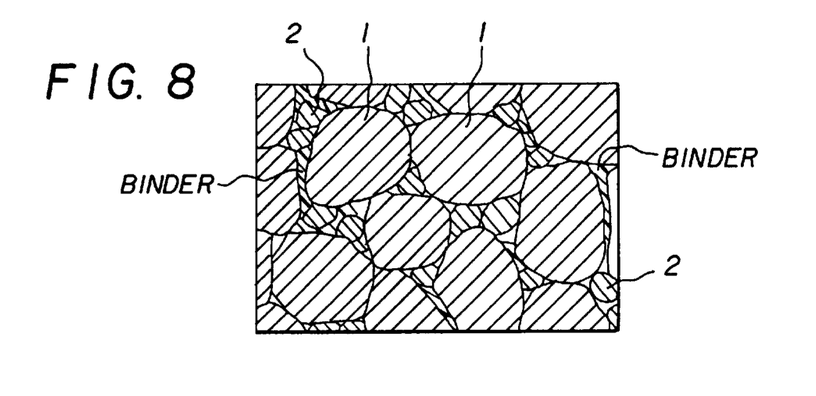
FIG. 8 is an enlarged sectional view schematically showing the structure of a molded body obtained by applying pressure to the mixture shown in FIG. 7.

FIG. 7 schematically shows the powders 1 and 2 and binder as mixed together. Further FIG. 8 schematically shows the state of the powders in the resulting molded body. The particles of binder shown in FIG. 7 turned gluelike, suitably ingressing into spaces between particles of other powders to join these particles as seen in FIG. 8, whereas interstices remain between the particles for hydrogen gas to pass therethrough.

The molded body obtained was placed into a container, then subjected to repeated hydrogen absorbing-desorbing cycles and checked for average particle size for every cycle. For the size measurement, the molded body was taken out from the container upon completion of every cycle, a portion of the body was collected by cutting and checked for distribution of particle sizes by a particle size measuring instrument, and the average particle sizes of the powders 1 and 2 were determined from two peaks appearing.

Figure 9:
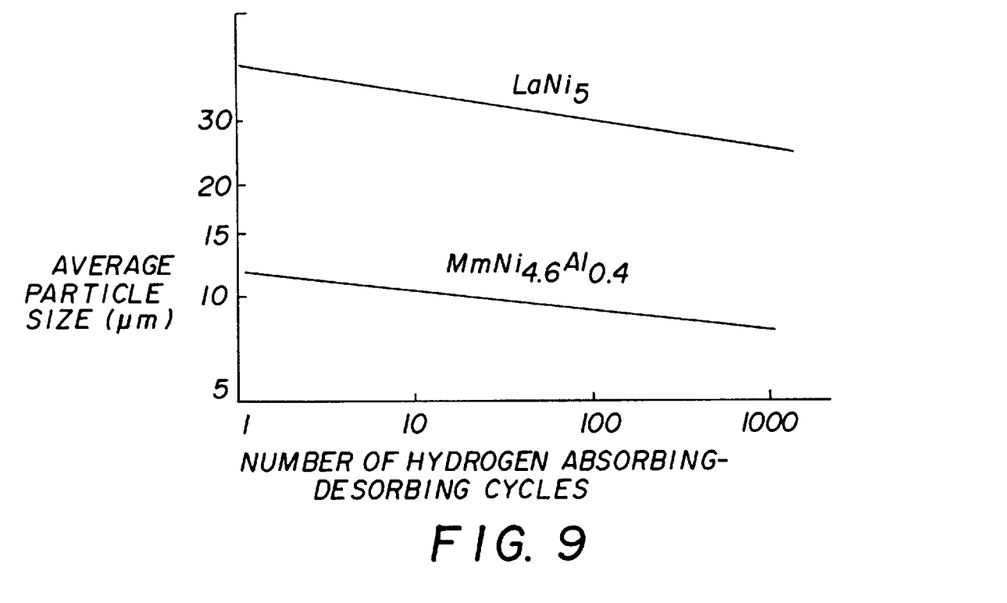
FIG. 9 is a graph showing the relationship between the number of repeated hydrogen absorbing-desorbing cycles to which the molded body was subjected and the average particle sizes of the respective powders.

The test result is shown in FIG. 9, which indicates that the average particle size ratio $d_2/d_1$ resulting from 1000 cycles is 0.31, showing that the initial ratio remains almost unaltered. This reveals that the container can be held packed with the body witlh a high density despite the repeated hydrogen absorbing-desorbing cycles. The result is attributable to the use of an alloy which is prone to size reduction as the powder 2 which undergoes retarded size reduction because of its small average particle size, so as to assure the powder 2 of expedited size reduction, with the result that the powder 2 and the powder 1, which has a great average particle size and therefore undergoes rapid size reduction, are reduced in size approximately at the same rate.

In the case of molded bodies, much consideration need not be given to the likelihood that the spaces between large particles will be excessively packed with small particles. Accordingly the ratio $d_2/d_1$ can be greater than 0.

EXAMPLE 9

In preparing the molded body of Example 8, the binder needs to be added in such an amount as will not lower the packing density of the alloy. When the powder mixture is compressed to prepare the molded body, the interstices between the particles further diminish. Accordingly, if the binder is used in such an amount that the interstices can be diminished by compression, the packing density obtained will not be lower than the packing density of the two kinds of powders as loosely mixed together.

Molded bodies were prepared with addition of the binder in an amount of 5 wt. %, 10 wt. % or 15 wt. % based on the alloy powders, and the alloy was checked for packing density. The result is shown in FIG. 10, in which the term "packing fraction" refers to a value obtained by calculating the weight of alloy corresponding to the volume of the molded body and calculating the ratio of the weight of alloy actually contained in the molded body to the calculated value.

Figure 10:
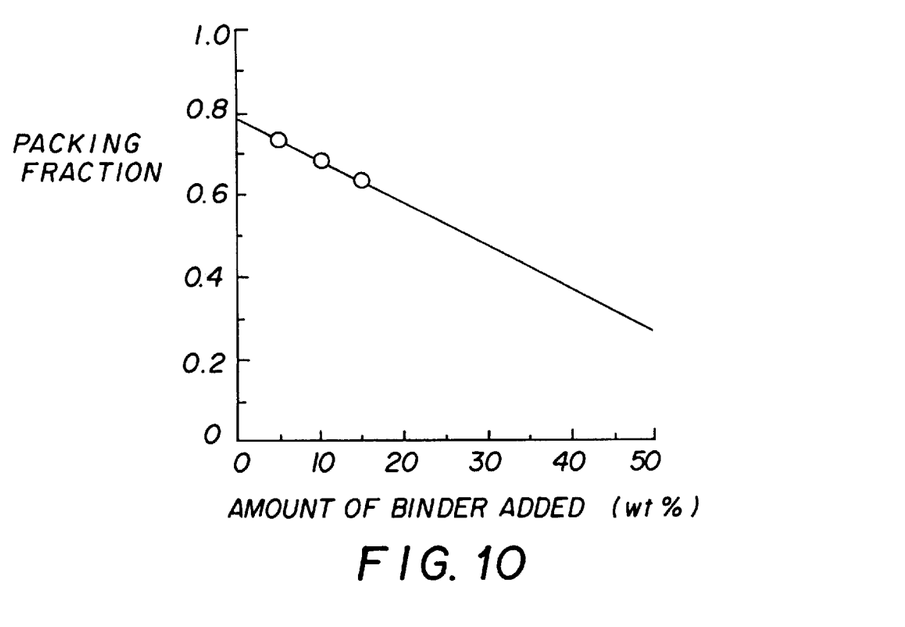
FIG. 10 is a graph showing the relationship between the amount of the binder used and the packing fraction of the powders.

As will be apparent from FIG. 10, the amount of binder added has a linear relationship with the packing fraction of the alloy in the molded body, and the amount of binder to be added needs to be up to 30 wt. % to ensure a packing fraction of at least 0.5. The amount is preferably up to about 20 wt. %, more preferably up to about 15 wt. %.

If the amount of binder added is too small, the desired binding effect will not be available, so that at least 5 wt. % of the binder should be used.

Incidentally, whether a particular hydrogen absorbing alloy is amenable to size reduction is dependent on the amount of expansion or contraction of the alloy when the alloy absorbs or desorbs hydrogen, such that the alloy is amenable to size reduction if the degree of expansion and contraction is great. For example, when Ni in $LaNi_5$ alloy is partly replaced by Al, the Al-substituted alloy expands or contracts to a greater extent and becomes more amenable to size reduction than the mother alloy, whereas if Ni is partly replaced by Co or Zr, the substituted alloy expands or contracts to a less extent and becomes less amenable to size reduction than the mother alloy.

The molded body described contains the hydrogen absorbing alloys with a high density and can therefore be filled into a container to a high density as it is or when suitably treated as by cutting in conformity with the inside shape of the container. Further even if the alloys are made into finer particles by repeated hydrogen absorbing-desorbing cycles, the powders retain their particle size ratio in the high-density packing state to the greatest possible extent. This obviates the situation that the expansion of the alloys produces local stress within the container.

The molded body can be so shaped by molding as to readily fill the container to be packed, in conformity with the shape of interior of the container. The molded body can be prepared in a desired shape, for example, in the shape of a disk, solid cylinder, rectangular parallelepiped, cube, or sphere.

The binder to be used in the present invention is not limited to polytetrafluoroethylene only but can be polyethylene oxide (PEO), polyvinylpyrrolidone (PVP) or other polymeric material.

EXAMPLE 10

An electrically conductive Ni powder may be used in place of the powder 2 of hydrogen absorbing alloy used in Example 9 to obtain a molded body, which is usable as an electrode of electrochemical cell.

Besides the La—Ni alloy of the foregoing examples, materials for hydrogen absorbing alloys for use in the present invention include, for example, Mm—Ni alloys, Fe—Ti alloys, Ti—Mn alloys and like alloys, whereas these alloys are not limitative.

As described above, the present invention gives containers packed with powders of hydrogen absorbing alloys an increased hydrogen absorbing capacity per unit interior volume of the container, increases the capacity of cells wherein the electrode is made of hydrogen absorbing alloy and provides compacted heat pumps wherein hydrogen absorbing alloy is utilized.

The examples described above are intended to illustrate the present invention and should not be construed as limiting the invention as defined in the appended claims or reducing the scope thereof. Furthermore, the invention is not limited to the foregoing examples in structure or feature but can of course be modified variously within the technical scope as set forth in the claims.

What is claimed is:

1. A container packed with a mixture of a first hydrogen absorving alloy powder, a second hydrogen absorbing alloy powder and a binder, wherein:

a) the first and second hydrogen absorbing alloy powders each have different particle size distributions and different particle sizes, b) the average particle size of the first hydrogen absorbing alloy powder is smaller than the average particle size of the second hydrogen absorbing alloy powder, c) the ratio of the average particle size of the first hydrogen absorbing alloy powder to the average particle size of the second hydrogen absorbing alloy powder is in the range of greater than 0 to not greater than 0.50, and d) the first hydrogen absorbing alloy powder undergoes pulverization faster than the second hydrogen absorbing alloy powder as a result of each alloy being subjected to repeated cycles of absorption and desorption of hydrogen.

2. The container as defined in claim 1 wherein the ratio of the average particle size of the first hydrogen absorbing alloy powder to the average particle size of the second hydrogen absorbing alloy powder is in the range of 0.03 to 0.50.

3. A container packed with a mixture of a first hydrogen absorbing alloy powder, second hydrogen absorbing alloy powder, a third hydrogen absorbing alloy powder and a binder, wherein:

a) the first, second and third hydrogen absorbing alloy powders each have different particle size distributions and different particle sizes, b) the average particle size of the first hydrogen absorbing alloy powder is smaller than the average particle size of the second hydrogen absorbing alloy powder, c) the ratio of the average particle size of the first hydrogen absorbing alloy powder to the average particle size of the second hydrogen absorbing alloy powder is in the range of greater than 0 to not greater than 0.50, d) the first hydrogen absorbing alloy powder undergoes pulverization faster than the second hydrogen absorbing alloy powder as a result of each alloy being subjected to repeated cycles of absorption and desorption of hydrogen, e) the average particle size of the second hydrogen absorbing alloy powder is smaller than the average particle size of the third hydrogen absorbing alloy powder, f) the ratio of the average particle size of the second hydrogen absorbing alloy powder to the average particle size of the third hydrogen absorbing alloy powder is in the range of greater than 0 to not greater than 0.50, and g) the second hydrogen absorbing alloy powder undergoes pulverization faster than the third hydrogen absorbing alloy powder as a result of each alloy being subjected to repeated cycles of absorption and desorption of hydrogen.

4. The container as defined in claim 2 wherein the ratio of the average particle size of the first hydrogen absorbing alloy powder to the average particle size of the second hydrogen absorbing alloy powder is in the range of 0.03 to 0.50, and the ratio of the average particle size of the second hydrogen absorbing alloy powder to the average particle size of the third hydrogen absorbing alloy powder is in the range of 0.03 to 0.50.

* * * * *

UNITED STATES PATENT AND TRADEMARK OFFICE
CERTIFICATE OF CORRECTION

PATENT NO.: 5,932,513
DATED : August 3, 1999
INVENTOR(S): NAKAMURA et al.

It is certified that errors appear in the above-identified patent and that said Letters Patent is hereby corrected as shown below:

On the Cover page, in item [75], delete "; Takahiro Yonesaki, Oura-gun; Kouichi Nishimura, Suita"

Also on the cover page, in item [30], "May 11, 1993" should read --November 5, 1993--; and "April 10, 1994" should read --October 4, 1994 --.

Signed and Sealed this

Second Day of May, 2000

Attest:

Attesting Officer

Q. TODD DICKINSON

Director of Patents and Trademarks